US010633806B2

(12) United States Patent
Sondreal et al.

(10) Patent No.: US 10,633,806 B2
(45) Date of Patent: Apr. 28, 2020

(54) ROTOR POSITION INDICATOR SYSTEM

(71) Applicant: Caterpillar Paving Products Inc., Brooklyn Park, MN (US)

(72) Inventors: Dustin W. Sondreal, Hanover, MN (US); Roger A. Hedlund, Champlin, MN (US); Jason W. Muir, Andover, MN (US); Ryan Hutar, Maple Grove, MN (US); Nicholas B. Johnson, Dayton, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 15/995,960

(22) Filed: Jun. 1, 2018

(65) Prior Publication Data
US 2019/0368137 A1 Dec. 5, 2019

(51) Int. Cl.
*E01C 23/088* (2006.01)
*E01C 23/12* (2006.01)
*G01B 5/00* (2006.01)
*G01B 3/00* (2006.01)

(52) U.S. Cl.
CPC .......... *E01C 23/088* (2013.01); *E01C 23/127* (2013.01); *G01B 3/004* (2013.01); *G01B 5/0007* (2013.01)

(58) Field of Classification Search
CPC ........ E01C 23/088; E01C 23/127; E02F 3/20; E02F 3/205
USPC ........................................................ 172/727
See application file for complete search history.

(56) References Cited

U.S. PATENT DOCUMENTS

| 3,414,327 | A | * | 12/1968 | Austin | E01C 19/008 |
| | | | | | 299/1.5 |
| 4,270,801 | A | | 6/1981 | Swisher, Jr. | |
| 5,485,886 | A | | 1/1996 | Bassett | |
| 6,116,699 | A | | 9/2000 | Kaczmarski et al. | |
| 7,472,492 | B1 | * | 1/2009 | Vecchio | E01C 19/00 |
| | | | | | 33/1 H |
| 7,830,045 | B1 | * | 11/2010 | Boulger | H01Q 1/246 |
| | | | | | 307/326 |
| 8,794,867 | B2 | | 8/2014 | Snoeck et al. | |
| 9,096,977 | B2 | | 8/2015 | Fritz et al. | |
| 2002/0129507 | A1 | | 9/2002 | Vecchio | |
| 2009/0010713 | A1 | * | 1/2009 | Kotting | E01C 19/004 |
| | | | | | 404/128 |
| 2014/0101886 | A1 | * | 4/2014 | Gabric | A47L 5/38 |
| | | | | | 15/323 |
| 2014/0348584 | A1 | * | 11/2014 | Fritz | G05D 1/0214 |
| | | | | | 404/72 |

(Continued)

FOREIGN PATENT DOCUMENTS

| CN | 106835919 A | 6/2017 |
| CN | 206971064 U | 2/2018 |
| JP | H09268516 A | 10/1997 |

*Primary Examiner* — Janine M Kreck
*Assistant Examiner* — Michael A Goodwin
(74) *Attorney, Agent, or Firm* — Schwegman, Lundberg & Woessner

(57) ABSTRACT

A rotor position indicator system may include a side plate and a first rotor width indicator plate. The side plate may be positioned on a side of an earth moving milling machine, and the first rotor width indicator plate may be inset on an external face of the side plate. The first rotor width indicator plate may include a plurality of markings, with each marking corresponding to a rotor position.

20 Claims, 4 Drawing Sheets

(56) References Cited

U.S. PATENT DOCUMENTS

| | | | |
|---|---|---|---|
| 2015/0115689 A1* | 4/2015 | Snoeck | E01C 23/088 |
| | | | 299/1.5 |
| 2016/0160452 A1* | 6/2016 | Orefice | E01C 23/088 |
| | | | 701/50 |
| 2016/0265174 A1 | 9/2016 | Engelmann et al. | |
| 2018/0051427 A1 | 2/2018 | Lee et al. | |
| 2019/0024328 A1* | 1/2019 | Stahl | E01C 23/088 |

* cited by examiner

ROTOR POSITION INDICATOR SYSTEM

TECHNICAL FIELD

This disclosure relates generally, but not by way of limitation, to constructing, repairing, reconditioning, or taking-up road or like surfaces. More particularly, this disclosure relates to apparatus, systems, and methods for indicating rotor position.

BACKGROUND

Earth moving milling machines such as cold planers and rotary mixers include a rotor that cuts or mixes the ground or asphalt. The position of the rotor is controlled by the machine to cut to different depths and widths. While the machine is operational, it is important to know the position of the rotor relative to any obstacles or desired cutting dimensions.

One attempt to address rotor position indication is described in U.S. Pub. No. 2018-0051427 A1 by Lee et al., published on Feb. 22, 2018. Lee provides a rotor position indication system including a light emitting device configured to emit a light signal that aligns with the front impact point which is a point on the ground surface where cutting will stop if the cutting process is terminated. Various conventional attempts are difficult to read, allow debris to leak through, interfere with other machine parts, are incomplete, are inaccurate, do not indicate total depth, etc.

SUMMARY OF THE INVENTION

To summarize at least a portion of the disclosure, a non-limiting list of examples is provided here:

In one aspect, the present disclosure relates to a rotor position indicator system including a side plate and a rotor width indicator plate. The side plate may be positioned on a side of an earth moving milling machine, and the rotor width indicator plate may be inset on an external surface of the side plate. The rotor width indicator plate may include a plurality of markings, each marking corresponding to a rotor position.

In another aspect, the present disclosure relates to a rotor position indicator system including a depth indicator, a rotor width indicator, and a machine height indicator. The depth indicator may be positioned on a side of an earth moving milling machine and may indicate a depth of the rotor relative to the earth moving milling machine. The rotor width indicator may be positioned on the side of the earth moving milling machine and may indicate a position of a width of the rotor. The machine height indicator may be positioned on the side of the earth moving milling machine and may indicate a raised height of the earth moving milling machine. The rotor width indicator may correspond to the depth indicator such that the rotor width indicator may identify a position of the width of the rotor for a given depth indicated by the depth indicator.

In another aspect, the present disclosure relates to a method of manufacturing a rotor depth indicator system. The method includes providing a depth indicator on a side of an earth moving milling machine to indicate a depth of a rotor of the earth moving milling machine. The method further includes providing a rotor width indicator on the side of the earth moving milling machine to indicate a position of a width of the rotor. The method also includes providing a machine height indicator on the side of the earth moving milling machine to indicate a raised height of the earth moving milling machine. The rotor width indicator corresponds to the depth indicator, such that the first rotor width indicator may identify a position of the width of the rotor for a given depth indicated by the depth indicator. The depth indicator and the machine height indicator together may indicate an actual depth of the rotor relative to a ground surface.

These and other examples and features of the present devices, systems, and methods will be set forth in part in the following Detailed Description. This overview is intended to provide a summary of subject matter of the present patent application. It is not intended to provide an exclusive or exhaustive removal of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A rotor position indicator system may include a rotor width indicator positioned on a first side of an earth moving milling machine, for example, on a side plate. In some examples, the rotor width indicator is inset relative to an external surface of the side plate to avoid interference with other parts of the machine. In some examples, the rotor width indicator is solid to avoid debris seepage through the rotor width indicator while the rotor is cutting. In some examples, the rotor width indicator is a different color or material than the side plate to allow for clearer visibility. The rotor width indicator indicates a width of the rotor based on the depth of the rotor. The rotor width indicator may indicate the position of the maximum width of the rotor, or it may indicate the width of the rotor where the rotor meets the ground surface.

In at least one example, the rotor position indicator system includes the rotor width indicator, a depth indicator, and a machine height indicator that are meant to be used together to determine an overall position of the rotor. For example, the height indicated by the machine height indicator may be subtracted from the depth indicated by the rotor depth indicator to provide the actual depth that the rotor extends into the ground. The depth indicated by the rotor depth indicator may also be used to determine which markings to use on the rotor width indicator to identify the position of the width of the rotor.

The disclosed rotor position indicator systems allow a user positioned on the side of the earth moving milling machine to identify the position of the rotor in order to ensure proper cutting depth, avoid obstacles, ensure precise start and end cuts, and the like. Further, the disclosed rotor position indicator systems allow the user to more easily and accurately perform these tasks, given the visibility of the indicator system as well as the information provided by the indicator system.

For the purposes of this disclosure, an earth moving milling machine is a construction machine that has a rotor that is used to cut ground, including natural earth or materials that surface the earth, for example, pavement, concrete, or the like. For the purposes of this disclosure a ground surfaces is a surface that makes up the ground, such as natural earth, pavement, concrete, or the like.

Figure 1:
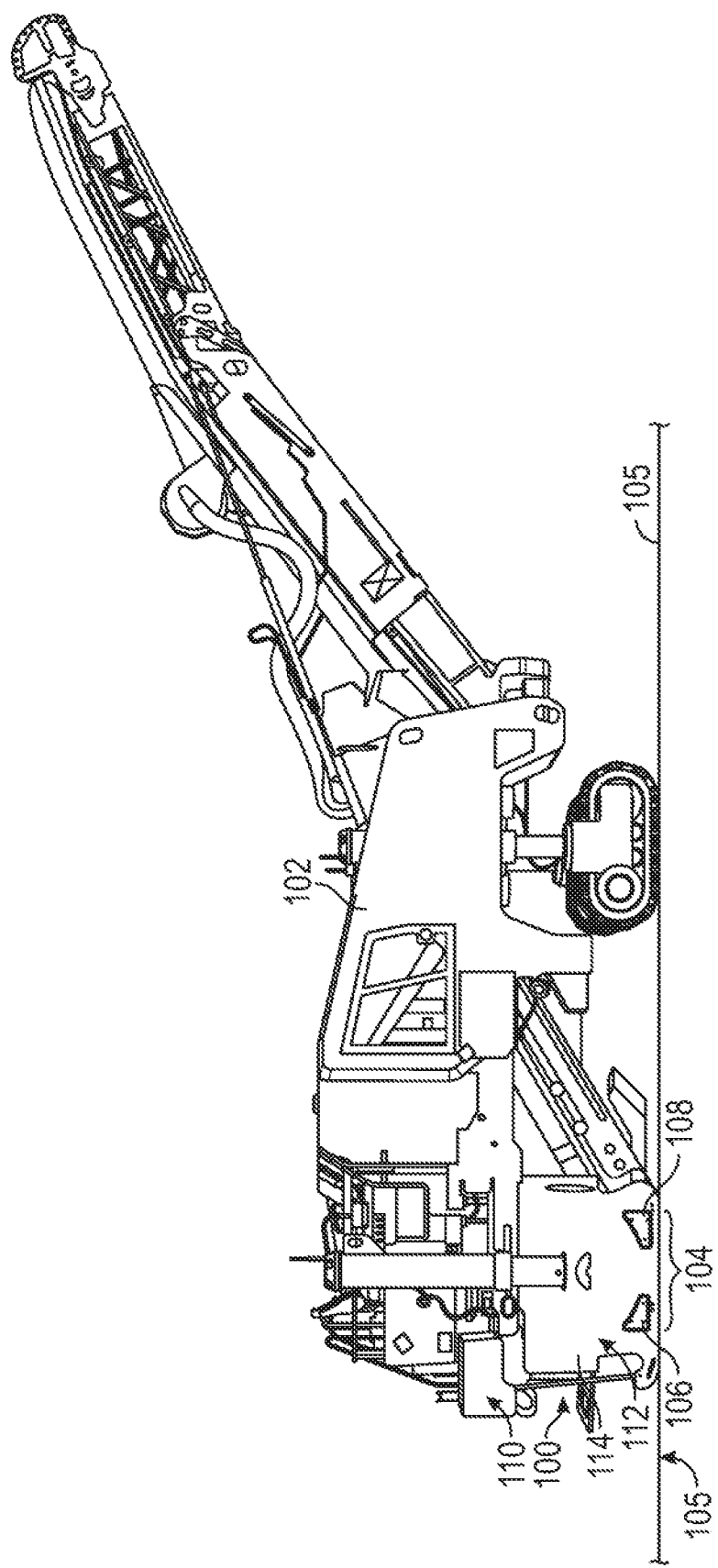
FIG. 1 is a side view of an exemplary rotor position indicator system on an earth moving milling machine.

FIG. 1 is a side view of an exemplary rotor position indicator system 100 on an earth moving milling machine 102, which in the illustrated example is a cold planer. However, it should be noted that the rotor position indicator system 100 may be used with other earth moving milling machines, such as a rotary mixer. In the illustrated example, the rotor position indicator system 100 includes a rotor width indicator 104 that indicates a width of the rotor of the earth moving milling machine 102. In some examples, the rotor width indicator 104 indicates the width of the rotor where the rotor intersects the ground surface 105. The illustrated rotor width indicator 104 includes first and second rotor width indicator plates 106, 108 positioned at a first side 110 of the earth moving milling machine 102. The first and second rotor width indicator plates 106, 108 are shown inset on an external face 112 of a side plate 114 positioned at the first side 110 of the earth moving milling machine 102. In other examples, the rotor width indicator plates 106, 108 may not be inset, for example, it may not be necessary in the case of some earth moving milling machines that do not include interfering parts. In at least one example, the rotor width indicator 104 may be positioned on the opposite side of the earth moving milling machine 102. In at least one example, rotor width indicators 104 may be positioned on both sides of the earth moving milling machine 102.

Figure 2:
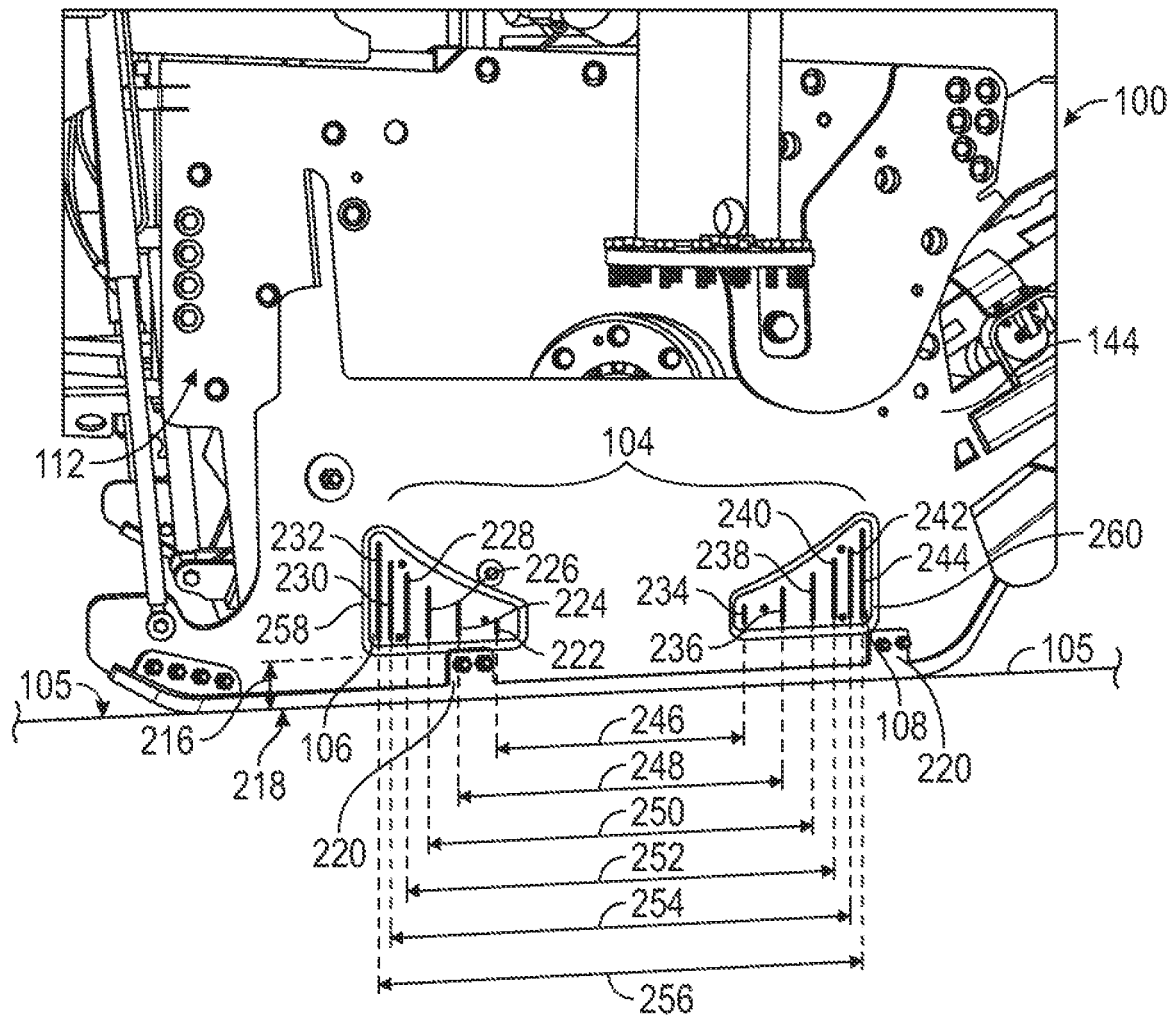
FIG. 2 is a side view of the rotor position indicator system of FIG. 1.

FIG. 2 is a side view of the rotor position indicator system 100 of FIG. 1. The rotor width indicator 104 may be positioned an offset distance 216 from a bottom surface 218 of the earth moving milling machine 102. In at least one example, the offset distance 216 allows the rotor width indicator 104 to avoid interference with other machine parts 220. The offset distance 216 may help avoid debris buildup on the rotor width indicator 104. The first rotor width indicator plate 106 includes a plurality of markings 222, 224, 226, 228, 230, 232, each of which corresponds with a rotor depth to indicate the rear (or aft) boundary of the rotor width where the rotor intersects the ground surface 105 at the given rotor depth. Each marking 222, 224, 226, 228, 230, 232 may reference its corresponding depth in any of a variety of ways, for example with text, with size of a marking, with colors, or the like. For example, the markings 222, 224, 226, 228, 230, 232 may include one or more symbols, raised elements, indented elements, alphanumeric characters, color coding, height difference, thickness difference, or the like. In the illustrated example, the markings 222, 224, 226, 228, 230, 232 vary in height, such that the shortest marking 222 corresponds to the smallest rotor depth, and the tallest marking 232 corresponds to the largest rotor depth. The markings 222, 224, 226, 228, 230, 232 may represent any range or increment (including a varying increment) of rotor depths, and while six markings are illustrated on the rotor width indicator plate 106, in other examples there may be more or less markings.

As an example, the markings 222, 224, 226, 228, 230, 232 may correspond to rotor depths of 2, 4, 6, 8, 10, and 12 units, respectively (e.g. 2, 4, 6, 8, 10, and 12 inches or 50, 100, 150, 200, 250, and 300 millimeters, respectively). In such an example, if the rotor depth is identified to be 4 units (4 inches or 100 millimeters), then marking 224 would indicate the rear (aft) boundary of the rotor width where the rotor intersects the ground surface 105 while inserted into the ground for a depth of 4 units (4 inches or 100 millimeters). In the illustrated example, the second rotor width indicator plate 108 includes similar markings 234, 236, 238, 240, 242, 244 to those described with reference to the first rotor width indicator plate 106, except that they indicate a front (or fore) boundary of the rotor width where the rotor intersects the ground 106 while inserted into the ground for a corresponding depth. Each marking corresponds to a rotor position (including depth of rotor and position of a width of the rotor).

Each rear (aft) marking 222, 224, 226, 228, 230, 232 and each front (fore) marking 234, 236, 238, 240, 242, 244 combine to indicate the rotor width where the rotor intersects the ground surface 105 for a given rotor depth. In the example provided above, for a rotor depth of 2 units (2 inches or 50 millimeters), markings 222, 234 of the first and second rotor width indicator plates 106, 108 would indicate a rotor width 246 where the rotor intersects the ground surface 105 and extends 2 units (2 inches or 50 millimeters) beyond. For a rotor depth of 4 units (4 inches or 100 millimeters), markings 224, 236 of the first and second rotor width indicator plates 106, 108 would indicate a rotor width 248 where the rotor intersects the ground surface 105 and extends 4 units (4 inches or 100 millimeters) beyond. For a rotor depth of 6 units (6 inches or 150 millimeters), markings 226, 238 of the first and second rotor width indicator plates 106, 108 would indicate a rotor width 250 where the rotor intersects the ground surface 105 and extends 6 units (6 inches or 150 millimeters) into the ground. For a rotor depth of 8 units (8 inches or 200 millimeters), markings 228, 240 of the first and second rotor width indicator plates 106, 108 would indicate a rotor width 252 where the rotor intersects the ground surface 105 and extends 8 units (8 inches or 200 millimeters) into the ground. For a rotor depth of 10 units (10 inches or 250 millimeters), markings 230, 242 of the first and second rotor width indicator plates 106, 108 would indicate a rotor width 254 where the rotor intersects the ground surface 105 and extends 10 units (10 inches or 250 millimeters) into the ground. For a rotor depth of 12 units (12 inches or 300 millimeters), markings 232, 244 of the first and second rotor width indicator plates 106, 108 would indicate a rotor width 256 where the rotor intersects the ground surface 105 and extends 12 inches (300 millimeters) into the ground.

In some examples, the side plate 114 may include one or more machined features or pockets 258, 260 for receiving the rotor width indicator 104, such that the rotor width indicator 104 does not extend beyond the external surface 112 of the side plate 114. For example, this may help to avoid interference with other machine parts, including moving machine parts as well as to avoid damage from external objects that may affect readability or function of the rotor width indicator 104. In the illustrated example, each machined feature (pocket) 258, 260 corresponds to one of the first and second rotor width indicator plates 106, 108, such that each rotor width indicator plate 106, 108 fits within the machined feature (pocket) 258, 260. In some examples, the side plate 114 includes a first color while the rotor width indicator 104 includes a second color, where the first color is different from the second color. For example, the rotor width indicator 104 could be yellow, while the side plate 114 is black. A distinction in color will help the rotor width indicator 104 be visibly distinct from the side plate to improve identification and readability. In some examples, the rotor width indicator 104 includes a different material than the side plate 114, for example zinc plating and aluminum could be used. In at least one example, each plate 106, 108 of the rotor width indicator 104 is solid without any openings to allow debris to escape, seep, or otherwise pass from inside the drum housing the rotor through the rotor width indicator 104. The rotor width indicator 104 may be coupled to the side plate 114 using for example, bolts, screws, adhesive, welding, or the like.

Figure 3:
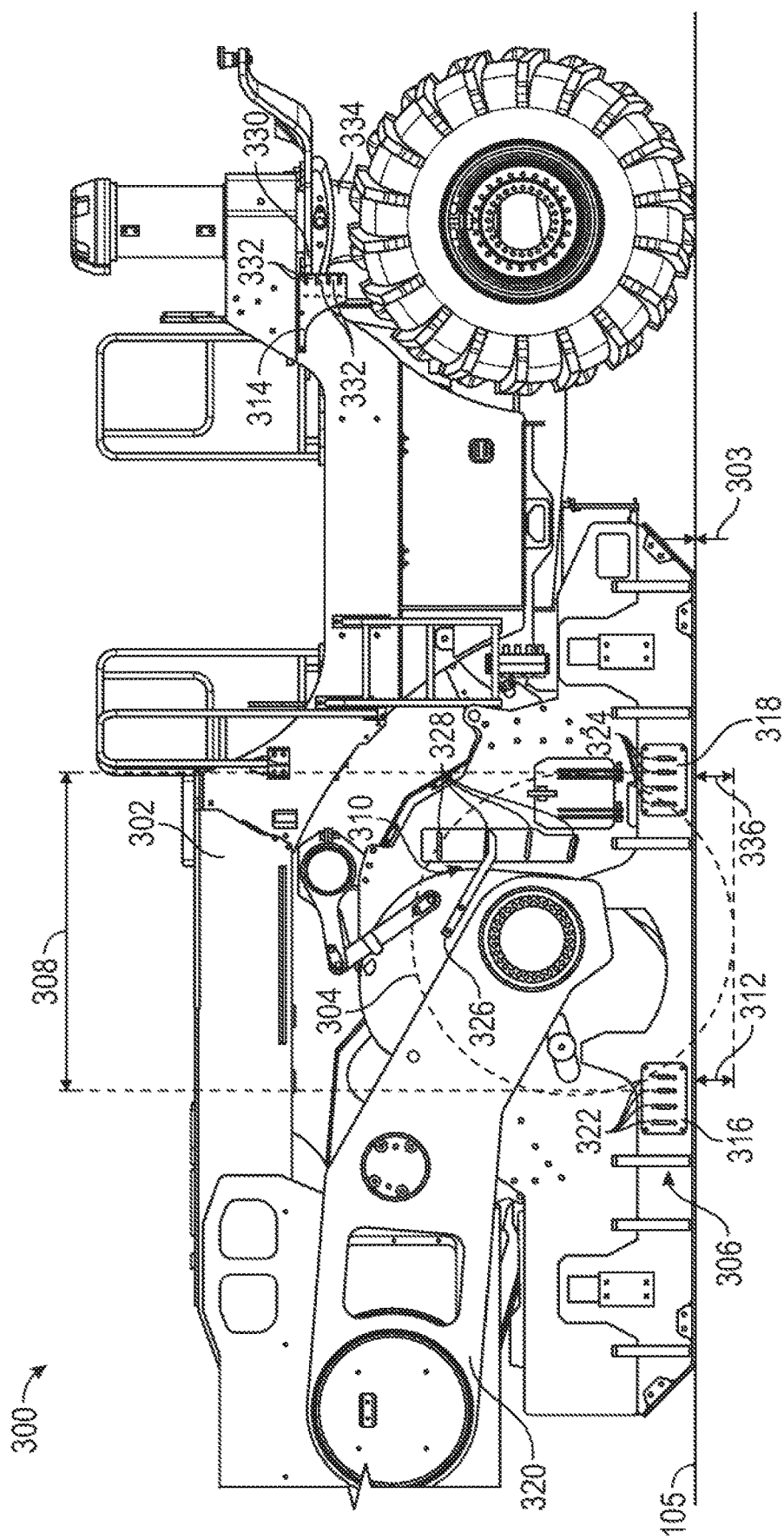
FIG. 3 is a side view of an exemplary rotor position indicator system on an earth moving milling machine set at a first height.

FIG. 3 is a side view of an exemplary rotor position indicator system 300 on an earth moving milling machine 302 set at a first height 303. Generally, the rotor position indicator system 300 allows a user to determine the position of a rotor 304 of the earth moving milling machine 302, which in the illustrated example is a rotary mixer. However, it should be noted that the rotor position indicator system 300 is not limited to use with a rotary mixer and may be used on other earth moving milling machines. In the illustrated example, the rotor position indicator system 300 includes a rotor width indicator 306 that indicates the position of a width 308 of the rotor 304, a depth indicator 310 that indicates a depth 312 of the rotor 304 relative to the earth moving milling machine 302, and a machine height indicator 314 that indicates the raised height 303 of the machine (a height of the machine relative to the ground surface 105).

The rotor width indicator 306 includes first and second rotor width indicator plates 316, 318 to indicate the fore and aft position of the rotor 304. The rotor width indicator 306 may include any one or more of the features of the rotor width indicator 104 described with reference to FIGS. 1 and 2. For some earth moving milling machines that attach the rotor 304 to an arm 320 that pivots or moves other than straight up and down, each rotor width indicator plate 316, 318, 106, 108 of the rotor width indicator 306, 104 will include a plurality of markings 322, 324 (222, 224, 226, 228, 230, 232, 234, 236, 238, 240, 242, 244) that correspond to a greater depth on the left than on the right (in the illustrated example of FIGS. 3 and 4) or on the right than on the left depending on the direction of movement of the arm 320 that results in greater depths. For such earth moving milling machines, the rotor width indicator 306, 104 may indicate the fore-and-aft (front and rear) position of the greatest width 308 of the rotor 304, or the fore-and-aft (front and rear) position of the width 246, 248, 250, 252, 254, 256 where the rotor 304 intersects the ground surface 105. For the latter width 246, 248, 250, 252, 254, 256, if the earth moving milling machine is capable of being raised to different heights relative to the ground surface 105, then some examples of the rotor width indicator 306, 104 may include additional sets of markings 322, 324 (222, 224, 226, 228, 230, 232, 234, 236, 238, 240, 242, 244) with each set corresponding to a specific height 303 of the earth moving milling machine 102, 302.

For earth moving milling machines that move the rotor 304 straight up and down, the lateral position of the greatest width 308 of the rotor 304 is constant, so the rotor width indicator 306, 104 may instead indicate the width 246, 248, 250, 252, 254, 256 where the rotor 304 intersects the ground surface 105, and the plurality of markings 322, 324 (222, 224, 226, 228, 230, 232, 234, 236, 238, 240, 242, 244) will correspond to a greater depth at the outer markings 232, 244 than at the inner markings 222, 234.

The depth indicator 310 includes a pointer 326 (e.g., a portion of the arm 320 or attached to the arm 320) and a plurality of markings 328. As the arm 320 moves, the pointer 326 points to a different marking of the plurality of markings 328 to indicate the depth 312 of the rotor 304 relative to the earth moving milling machine 302. The indicated depth 312 may be used with the plurality of markings 322, 324 of the rotor width indicator 306 to identify the position of the rotor width 308 at the given depth 312. In the illustrated example, the pointer 326 points to a depth of 6 units (6 inches or 150 millimeters), and the 6 unit (6 inch or 150 millimeter) marking of the plurality of markings 322, 324 is used to identify the position of the maximum width 308 of the rotor 304 (maximum width 308 being parallel to the ground surface 105).

The machine height indicator 314 includes a pointer 330 and a plurality of markings 332. The pointer 330 may include a portion of a leg 334, a portion of the earth moving milling machine 302 that is not raised with the rest of the machine (while the plurality of markings 332 do raise with the machine), or a portion of the earth moving milling machine 302 that is raised with the rest of the machine (while the plurality of markings 332 do not raise with the machine). As the earth moving milling machine 302 is raised and lowered, the pointer 330 points to one of the plurality of markings 332 to indicate the raised height 303 of the earth moving milling machine 302 relative to the ground surface 105. In the illustrated example, the earth moving milling machine 302 has not been raised, the pointer 330 points to a height of 0 units (0 inches or 0 millimeters) and the earth moving milling machine 302 is at its starting or normal height relative to the ground surface 105 (for illustrative purposes it is flush with the ground surface, but in other examples it may be raised a known amount that is accounted for by the depth indicator 310).

The height 303 indicated by the machine height indicator 314 may be combined with the depth 312 indicated by the depth indicator 310 to determine an actual depth 336 that the rotor 304 extends into the ground beyond the ground surface 105. The height 303 and the depth 312 may be combined via addition or subtraction depending on the information provided by the depth indicator 310 and the machine height indicator 314. In the illustrated example, the markings 332 of the machine height indicator 314 provide positive integers, such that the positive integer corresponding to the height 303 is subtracted from the depth 312 indicated by the depth indicator 328 to determine the actual depth 336. In another example, the markings 332 machine height indicator 313 may provide negative numbers, such that the numbers would be added to the indicated depth 312 to determine the actual depth 336. In the illustrated example, the machine height indicator 314 indicates a raised height 303 of 0 units (0 inches or 0 millimeters) and the depth indicator 310 indicates a depth of 6 units (6 inches or 150 millimeters). Based on the indicated depth of 6 units (6 inches or 150 millimeters), each marking of the plurality of markings 322, 324 corresponding to a 6 unit depth can be identified to determine the position of the width 308 of the rotor 304 (in the illustrated example, the marking corresponding to a 6 unit depth is positioned second from the right on each of the rotor width indicator plates 316, 318). The raised height 303 indicated by the machine height indicator 314 can be combined (in this case subtracted from) the depth 312 indicated by the depth indicator 310 to determine the actual depth 336 of the rotor 304—6 units (6 inches or 150 millimeters) minus 0 units (0 inches or 0 millimeters) equals 6 units (6 inches or 150 millimeters, so the actual depth 336 in the illustrated example of FIG. 3 is 6 units (6 inches or 150 millimeters).

The markings of the various indicators may vary in number of markings, order of markings, type of markings, display of markings, or the like.

In at least one example, the rotor position indicator system 300 may be positioned on both sides of the earth moving milling machine 302, such that each side of the earth moving milling machine 302 has a rotor width indicator 306, a depth indicator 310, and a machine height indicator 314. In some examples, one or more of the indicators 306, 310, 314 may include a different color or different material than its surroundings to improve visibility of the indicator. In at least one example plating could be used to improve visibility or readability of one or more of the indicators 306, 310, 314, for example zinc plating and aluminum.

Figure 4:
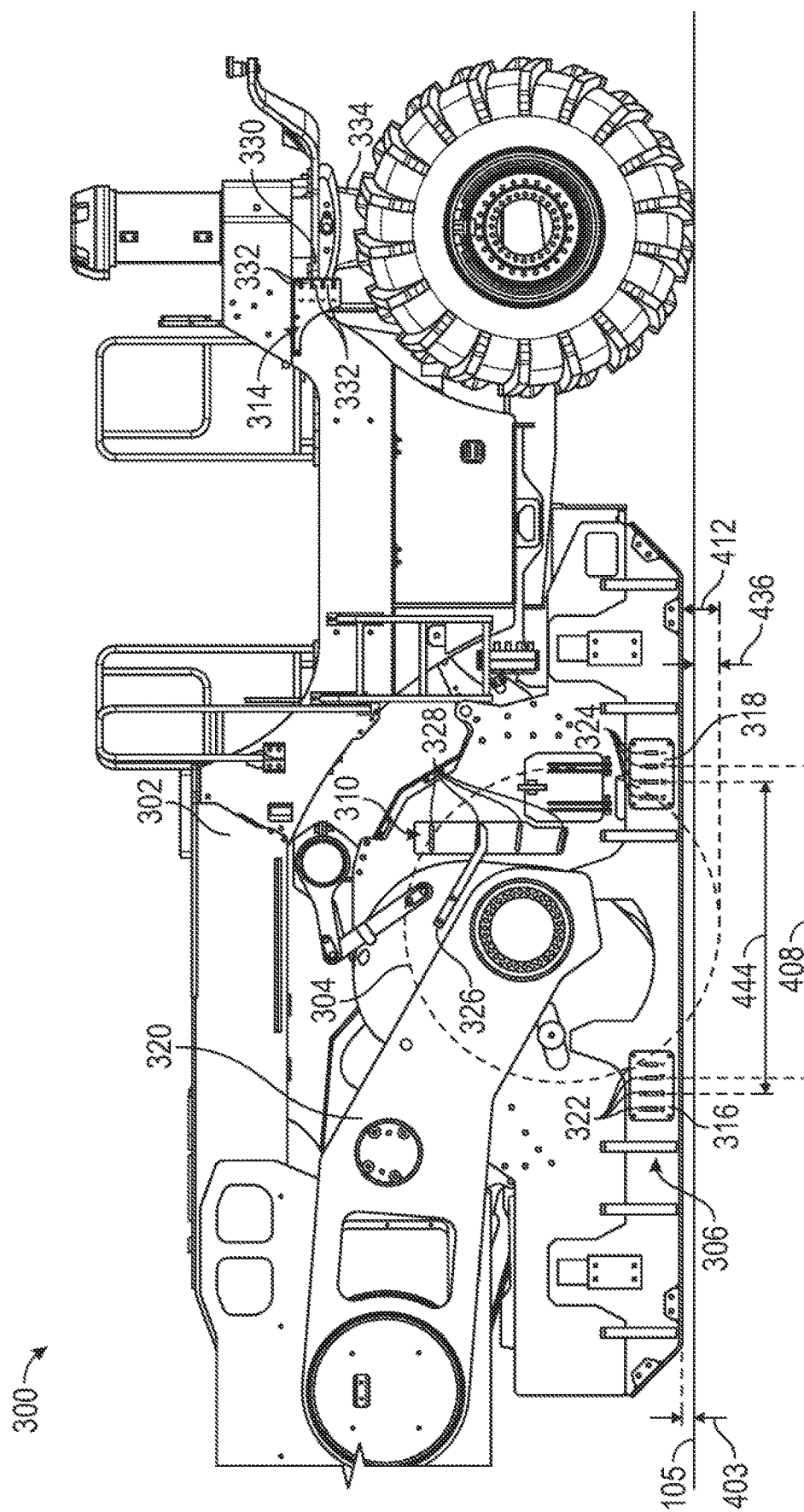
FIG. 4 is a side view of the rotor position indicator system and earth moving milling machine of FIG. 3 with the earth moving milling machine set at a second height.

FIG. 4 is a side view of the rotor position indicator system 300 and earth moving milling machine 302 of FIG. 3 with the earth moving milling machine 302 set at a second height 403. The leg 334 or other structural feature has raised the earth moving milling machine 302 from the first height 303 of FIG. 3 to the second height 403 of FIG. 4. As such, when the raised height 403 is combined with the indicated depth 412 (which in this case remains at 6 units (6 inches or 150 millimeters)) the actual depth 436 differs from the indicated depth 412 as well as the actual depth 336 of FIG. 3. Subtracting the raised height 403 from the indicated depth 412 (which measures the depth of the rotor 304 relative to the machine) results in the actual depth 436 (that the rotor 304 extends into the ground below the ground surface 105). In this case, the 6 unit (6 inches or 150 millimeters) indicated depth 412 minus a 2 unit (2 inches or 50 millimeters) raised height 403 equals a 4 unit (4 inches or 100 millimeters) actual depth 436, such that the rotor 304 extends into the ground 4 units (4 inches or 100 millimeters) beyond the ground surface 105.

Since the indicated depth 412 is the same as the indicated depth of FIG. 3, the position of the width 408 of the rotor 304 in FIG. 4 is also the same as the position of the width 308 in FIG. 3. However, if the arm 320 were to be moved such that the pointer moved down to point to the 12 unit marking (12 inches or 300 millimeters) the 12 unit (12 inches or 300 millimeters) markings on the rotor width indicator 306 would be used to identify the position of the maximum width 444 of the rotor 304 (the maximum width 444 being parallel to the ground surface 105). As can be seen, if the arm 320 were to move down in that manner the rotor 304 would be shifted to a deeper depth as well as shifted to the left (relative to the orientation in the illustrated figure).

As indicated by the side views of FIGS. 3 and 4, each of the rotor width indicator 306, the depth indicator 310 and the machine height indicator 314 are positioned on the same side of the earth moving milling machine 302, such that a user may view all of the indicators at once to determine the position of the rotor 304 relative to external objects, obstacles, markings, etc. Further, the actual depth 336, 436 can be determined to adjust the rotor depth 312, 412 or the machine height 303, 403 as needed to get the desired actual depth 336, 436 for cutting.

In the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific examples. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific examples. However, the benefits, advantages, solutions to problems, and any feature(s) that may cause any benefit, advantage, or solution to occur or become more pronounced are not to be construed as a critical, required, or essential feature of any or all the claims. Moreover, the particular examples disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular examples disclosed above may be altered or modified and all such variations are considered within the scope of the disclosed subject matter. Accordingly, the protection sought herein is as set forth in the claims below.

INDUSTRIAL APPLICABILITY

The disclosed rotor position indicator systems may be applicable to any cold planer, rotary mixer, or other machinery involving a rotor. The disclosed rotor position indicator systems may result in more accurate indication of rotor position, more precise movement of the rotor relative to obstacles, easier to read and identify indication of rotor position, less interference with other machine parts, etc.

In at least one disclosed example, the rotor position indicator system includes a rotor width indicator that is inset relative to an external surface of a side plate, which prevents interference with other machine parts. In some examples the width indicator is a different color or material than the side plate, which allows it to be more easily identified and more easily read. In at least one example, the rotor width indicator is solid without any openings that extend through the rotor width indicator or the side plate to the rotor, which keeps debris from the rotor from exiting through the side plate or rotor width indicator.

In some examples, the rotor position indicator system includes a machine height indicator and a depth indicator, where the depth indicator indicates a depth of the rotor relative to the earth moving milling machine, and the machine height indicator indicates a raised height of the earth moving milling machine (e.g., the height that the machine has been raised relative to the ground by legs or other supports), which allows the actual depth of the rotor relative to the ground surface to be determined (by subtracting the raised height from the indicated depth). In some examples, the rotor position indicator system includes a rotor width indicator, a machine height indicator, and a depth indicator, which allows an accurate determination of the fore-and-aft position of the rotor as well as the depth of the rotor relative to the ground. In some examples, the entire indicator system is positioned on the same side of the earth moving milling machine, which allows someone to determine the rotor position relative to obstacles, desired start points, desired end points, etc.

What is claimed is:

1. A rotor position indicator system comprising:
   a side plate positioned on a first side of an earth moving milling machine; and
   a rotor width indicator to indicate a total width of the rotor, the rotor width indicator including:
      a first rotor width indicator plate inset on an external face of the first side plate, the first rotor width indicator plate including a plurality of markings, each marking of the plurality of markings corresponding to a fore position of the rotor; and
      a second rotor width indicator plate inset on the external face of the first side plate, the second width indicator plate including a plurality of markings, each marking of the plurality of markings corresponding to an aft position of the rotor.

2. The rotor position indicator system of claim 1, further comprising:
   a third rotor width indicator plate inset on an external face of a second side plate, the third rotor width indicator plate including a plurality of markings, each marking of the plurality of markings corresponding to a fore position of the rotor.

3. The rotor position indicator system of claim 2, further comprising:
   a fourth rotor width indicator plate inset on the external face of the second side plate, the fourth rotor width indicator plate including a plurality of markings, each marking of the plurality of markings corresponding to an aft position of the rotor.

4. The rotor position indicator system of claim 1, wherein the fore and aft positions of the rotor correspond to a depth of the rotor.

5. The rotor position indicator system of claim 1, wherein the total width of the rotor is a width of the rotor where the rotor intersects a ground surface.

6. The rotor position indicator system of claim 1, wherein the first side plate includes a machined feature to receive the first rotor width indicator plate within the first side plate, such that an external surface of the first rotor width indicator plate is inset relative to the external surface of the first side plate.

7. The rotor position indicator system claim 1, wherein:
   the first side plate includes a first color;
   the first rotor width indicator plate includes a second color; and
   the first color is different from the second color, such that the first rotor width indicator plate is visibly distinct from the first side plate.

8. The rotor position indicator system of claim 1, wherein the first rotor width indicator plate is solid, such that debris cannot pass through the first rotor width indicator plate.

9. A rotor position indicator system comprising:
   a depth indicator positioned at a first side of an earth moving milling machine, the depth indicator configured to indicate a depth of the rotor relative to the earth moving milling machine;
   a rotor width indicator positioned on a side plate at the first side of the earth moving milling machine, the rotor width indicator configured to indicate a position of a width of the rotor including a fore position of the rotor and an aft position of the rotor; and
   a machine height indicator positioned at the first side of the earth moving milling machine, the machine height indicator configured to indicate a raised height of the earth moving milling machine;
   wherein the rotor width indicator corresponds to the depth indicator, such that the rotor width indicator is configured to identify a position of the width of the rotor for a given depth indicated by the depth indicator.

10. The rotor position indicator system of claim 9, wherein the depth indicator and the machine height indicator are configured to together indicate an actual depth of the rotor relative to a ground surface.

11. The rotor position indicator system of claim 10, wherein a height measurement of the machine height indicator is configured to be subtracted from a depth measurement of the depth indicator to identify the actual depth of the rotor relative to the ground surface.

12. The rotor position indicator system of claim 9, wherein the rotor width indicator includes first and second rotor width indicator plates, each of the first and second rotor width indicator plates including a plurality of markings, each marking of the plurality of markings corresponding to a depth marking on the depth indicator.

13. The rotor position indicator system of claim 12, wherein the first rotor width indicator plate identifies the fore position of the rotor, and the second rotor width indicator plate identifies the aft position of the rotor.

14. The rotor position indicator system of claim 13, wherein the fore and aft position of the rotor corresponds to a position of the maximum width of the rotor parallel to a ground surface.

15. The rotor position indicator system of claim 9, wherein the rotor width indicator is inset on a surface of the side plate at the first side of the earth moving milling machine.

16. The rotor position indicator system of claim 15, further comprising:
   the side plate, wherein the side plate includes at least one machined pocket for receiving the rotor width indicator such that the rotor width indicator is inset relative to the surface of the side plate.

17. The rotor position indicator system of claim 15, wherein:
   the side plate includes a first color;
   the rotor width indicator includes a second color; and
   the first color is different from the second color, such that the rotor width indicator is visibly distinct from the side plate.

18. The rotor position indicator system of claim 15, wherein the rotor width indicator is bolted to the side plate.

19. A method of manufacturing a rotor depth indicator system, the method comprising:
   providing a depth indicator at a first side of an earth moving milling machine, the depth indicator configured to indicate a depth of a rotor of the earth moving milling machine;
   providing a rotor width indicator inset on a side plate at the first side of the earth moving milling machine, the rotor width indicator configured to indicate a fore and aft position corresponding to a width of the rotor where the rotor meets a ground surface; and providing a machine height indicator at the first side of the earth moving milling machine, the machine height indicator configured to indicate a raised height of the earth moving milling machine;

wherein the rotor width indicator corresponds to the depth indicator, such that the first rotor width indicator is configured to identify a position of the width of the rotor for a given depth indicated by the depth indicator;

wherein the depth indicator and the machine height indicator are configured to together indicate an actual depth of the rotor relative to the ground surface.

20. The method of claim 19, further comprising:

providing the side plate at the first side of the earth moving milling machine; and coupling the rotor width indicator to the side plate such that the rotor width indicator is inset relative to an external surface of the side plate.

\* \* \* \* \*